United States Patent Office 3,709,705
Patented Jan. 9, 1973

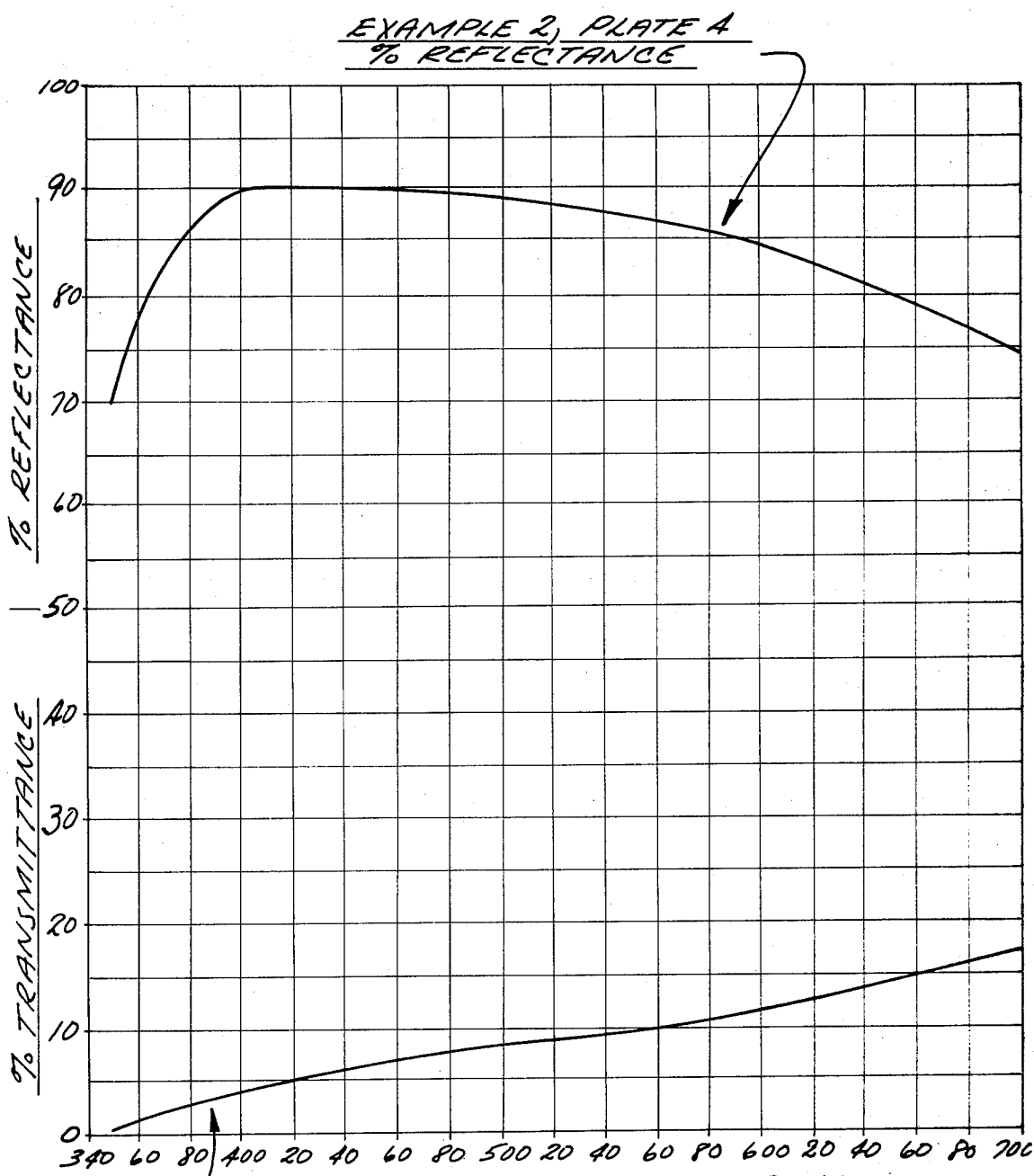

3,709,705
OPALIZABLE ALKALINE EARTH ALUMINO-SILICATE GLASS COMPOSITIONS
Erwin C. Hagedorn, Oregon, Ohio, assignor to Owens-Illinois, Inc.
Continuation of application Ser. No. 814,104, Apr. 7, 1969, which is a continuation-in-part of application Ser. No. 653,357, July 14, 1967, both now abandoned. This application Jan. 13, 1971, Ser. No. 106,235
Int. Cl. C03c 3/04
U.S. Cl. 106—54                                                   6 Claims

ABSTRACT OF THE DISCLOSURE

A system of thermally opalizable glass compositions comprising $SiO_2$, $Al_2O_3$, $B_2O_3$, $Na_2O$, $CaO$ and $MgO$. The above-mentioned compositions can be used to form opal articles having outstanding properties such as low coefficients of thermal expansion and high resistance to thermal shock and chemical attack. The resultant articles, which are converted to opal articles during forming or by subsequent heat treatments, are useful, for instance, as containers including cookware and dinnerware.

CROSS REFERENCE TO RELATED APPLICATIONS

This application is a continuation of Ser. No. 814,104, filed Apr. 7, 1969, and now abandoned which was in turn a continuation-in-part of my copending application Ser. No. 653,357, filed July 14, 1967, now abandoned and assigned to the same assignee as the present invention.

THE INVENTION

The present invention pertains to the glass art. More particularly, the present invention pertains to glass compositions and methods for converting such compositions to opal and opalescent glass articles.

The term "opal glass" as used herein denotes any glass which has a light diffusion medium or phase therein which renders the glass essentially light diffusing and thus translucent or opaque. The term "opalescent glass" refers to those opal glasses which have light diffusing medium therein which renders the glass translucent. Opal glasses of various types are well known in the art and opalizing agents utilized in the past include titanium and tin compounds, fluorides, sulfates, chlorides, phosphates, and various other salts. Fluoride opal glasses have been known to be particularly desirable for illuminating purposes in having a wide latitude of opal density (degree of opacity). Other common forms of opal glasses are fire opals and alabaster glasses for producing illuminating glassware as well as other forms of artware.

The opal glasses of the present invention can be used in the above and other applications in the field of science, industry and commerce in the forms of containers for therapeutic and cosmetic creams, for deodorant containers, lighting globes, glass filters and the like.

In making opal glasses by the prior art methods utilizing conventional opacifying agents, it is often necessary to rebuild or replace the glass melting furnace at frequent intervals due to the corrosive nature of the fluorides and phosphates on the furnace refractories. Additionally, the batch costs for such opal glasses are often quite high as compared to conventional soda-lime-silica glass batch costs.

Another disadvantage of the known opal glasses is that the degree of opacity is often difficult to control and non-uniformity of opacity in the finished article is frequently a problem. This nonuniformity is caused by improper mixing of the opacifying agent in the batch, which results in localized uncontrolled development of the opalizing species.

In view of the foregoing, it is an object of the present invention to provide a novel system of opal glass compositions.

Another object is to provide a novel method of producing opal glass articles from relatively inexpensive glass compositions.

A further object of the present invention is to produce novel, chemically stable, thermally opalizable glass compositions.

Still another object is to provide novel opal glasses that do not require the presence of a crystalline species as the opacifying agent.

And yet another object is to provide improved opal glass articles.

In attaining the objects of the present invention, one feature resides in the heat treatment of certain alkaline earth aluminosilicate compositions to promote an internal glass in glass phase separation.

The above and other objects, features, and advantages of the present invention will become apparent to those skilled in the art from the following specification and drawing wherein:

The figure is a graph illustrating the reflectance and transmittance of an exemplary opal glass as a function of wavelength.

According to the present invention certain glass compositions within the alkaline earth aluminosilicate systems are melted by conventional methods and subjected to a predetermined heat treatment designed to effect the desired opalization through the mechanism of an in situ glass-in-glass phase separation. By this mechanism, the degree of opacity or translucency can be controlled through the proper heat treatment with respect to the composition.

Usually, the present glasses are comprised of six components. These components, and their primary function, will be briefly described.

The primary glass forming oxide is, of course, silica ($SiO_2$), whose function is well known in glassy systems.

The glasses also contain alumina ($Al_2O_3$) which serves two purposes: (A) The presence of alumina tends to increase the resistance of the glass compositions to devitrification during the opalizing heat treatment; and (B) the rate of opalization is controlled by the presence of alumina since opalization rate decreases with increasing amounts of $Al_2O_3$. These two effects are dependent on glass viscosity and as such are related to the $A_2O_3$ content because the content of $Al_2O_3$ substantially controls the viscosity of the present glasses.

The alkaline earth oxides, $CaO$ and $MgO$, are both usually present and tend to increase the chemical stability of the dispersed opalizing phase. These oxides also effect glass viscosity.

Boric oxide ($B_2O_3$) is present and is the primary opalizing agent in that the tendency for opalization increases with increasing $B_2O_3$.

Soda ($Na_2O$) in addition to being a fluxing agent, also serves as a stabilizing agent in that the tendency for opalization decreases with increasing soda content. The ratio of $Na_2O$ to $B_2O_3$ is then important in determining the time and temperature of the opalizing heat treatment for any glass composition. It has been found that opalescent glasses can be produced in the absence of either $Na_2O$ or $B_2O_3$, but the opalization of these glasses is not easily controlled when compared to glasses where both of these constituents are present. Glass compositions containing both $Na_2O$ and $B_2O_3$ are therefore preferred.

Other alkali oxides such as potassia ($K_2O$) and lithia ($Li_2O$) can also be present in the amounts indicated in the following table. It is preferred that no lithia be present since this oxide promotes devitrification at elevated temperatures.

The ranges and ratio of these components, particularly for use in preparing clear glass articles which are opalized by subsequent heat treatments, are set forth below in tabular form.

| Oxide | Broad range | Usual range |
|---|---|---|
| $SiO_2$ | 55–76 | 60–70 |
| $Al_2O_3$ | 1.5–12 | 4–8 |
| $B_2O_3$ | 0–13 | 1–9 |
| CaO | 5–20 | 6–16 |
| MgO | 0–15 | 4–12 |
| $Na_2O$ | 1–11 | 3–7 |
| $K_2O$ | 0–5 | 0 |
| $Li_2O$ | <2 | 0 |
| Wherein: | | |
| $(CaO+MgO)$ | 10–30 | 14–21 |
| $(Na_2O+K_2O)$ | <11 | <8 |
| Weight percent $B_2O_3$/weight percent $Na_2O$ | 0–5 | 0.2–3 |
| $(SiO_2+Al_2O_3+B_2O_3+CaO+MgO+Na_2O+K_2O)$ | >95 | >98 |

In accordance with conventional practices, colorant oxides such as the oxides of cobalt, copper, chromium, nickel and manganese, can be included in the above glass compositions to produce opal and opalescent glasses of various colors and shades. These colors and shades can be controlled by controlling the oxygen balance of the melt, and the time and temperature of heat treatment. Usually these colorant oxides, when present alone or in combination are present in an amount not more than about 2% by weight of the overall glass composition.

In practicing the present invention, an alkaline earth aluminosilicate glass is selected within the above range of components. The small amounts of $B_2O_3$ and $Na_2O$ are necessary to promote and control the desired glass-in-glass phase separation. It has been determined that the presence of both of these components is desirable to achieve the maximum control over the transformation of the initial transparent glass to the opal or opalescent state.

The selected glass composition is melted and formed into articles using conventional glass melting and forming techniques. Ordinary batch materials can be used provided they can be melted to form the desired composition. This choice is primarily based on economic considerations. It will be understood that the molten glass should be as homogeneous as possible before forming the desired articles.

After the glass article is formed, it is then subjected to a predetermined heat treatment for a time sufficient to effectuate the desired phase separation.

In some compositions of the present invention, this phase separation occurs so rapidly that the glass becomes opal or opalescent under the influence of the thermal conditions prevalent during the forming operations. For such compositions that opalize at a high rate to become opal either while in the mold or during some other step of the forming operation, it has been found that the following opalizable alkaline earth aluminosilicate glass compositions are preferred, such compositions consisting essentially of:

| Component: | Percent by weight |
|---|---|
| $Al_2O_3$ | 1.5–12 |
| $SiO_2$ | (1) |
| $B_2O_3$ | 0–15 |
| CaO | 5–20 |
| MgO | 0–15 |
| $Na_2O$ | 1–11 |
| $K_2O$ | 0–5 |
| $Li_2O$ | <2 |

¹ Balance (preferably 55–76).

Wherein

| | Percent by weight |
|---|---|
| $CaO+MgO$ | 10–30 |
| $Na_2O+K_2O$ | <11 |
| Weight percent $B_2O_3$/weight percent $Na_2O$ | 0–15 |
| $(SiO_2+Al_2O_3+B_2O_3+CaO+MgO+Na_2O)$ | >95 |

In other compositions of the present invention, it is necessary to subject the formed glass article to a heat treatment subsequent to the forming operation to achieve the desired degree of opalescence. It will be apparent that the present invention provides a wide range of thermally opalizable glass compositions as well as specifying the relationship of these compositions to the required opalizing heat treatment.

The time and temperature relationship for the heat treatment is primarily dependent on composition. It will be understood that higher temperatures require shorter time periods to effect the desired phase separation, but that the glass is also more likely to deform and devitrify at these higher temperatures. For the purposes of the present invention, temperatures ranging from about 600° C. to about 980° C. for periods of from 15 minutes to about 64 or more hours are satisfactory. Usually, the temperatures in the range of about 650° C. to about 850° C. for periods of from 30 minutes to about 8 hours are employed in the interest of economic practicability. Shorter time periods and lower temperatures favor the formation of the translucent glasses, while the longer time periods at higher temperatures favor formation of the densely opal glasses. The degree of opalescence is then effectively controlled by manipulating the time temperature relationship.

As described above, the presence of $Na_2O$ in the glass is important in that it tends to add stability to the resulting opal glass. The tendency of the glass to undergo the phase separation decreases with increasing amounts of $Na_2O$ within the ranges indicated.

It is highly desirable that aluminum oxide in at least 1.5 percent by weight be used to control opalization and at the same time retard the tendency of the compositions to crystallize at the surface. While aluminum oxide can be used in an amount of as high as about 10–12 percent by weight, it is preferred that the aluminum oxide be used in the range of about 2–8 percent by weight. In addition to promoting opalization and retarding surface crystallization, the aluminum oxide increases the chemical durability of the resultant articles which is important for resistance to staining from coffee, tea and fruit juices such as in cookware or dinnerware.

The $B_2O_3$ is important in that the tendency of the glass to undergo the phase separation increases with increasing amounts of $B_2O_3$. Thus, by properly balancing the amounts of $B_2O_3$ and $Na_2O$ with respect to the amount of other oxides present, the properties of the resulting opalescent glass can be controlled.

The exact mechanism by which the phase separation that causes the opalization phenomenon occurs is not presently known. It is strongly suspected, however, that the opalization process involves a physical-chemical process known as "spinodal decomposition." The factors governing spinodal decomposition are not completely understood, but it is known that composition and time and temperature of the heat treatment are the controlling factors.

Spinodal decompositions can be described as the separation of a mutual solution containing two or more components, into at least two separate phases which phases are within the unstable spinodal region of the system phase diagram. This phase separation is described as "spinodal" because this term mathematically describes that area enclosed by a graph of the thermodynamic property of free energy as a function of composition in the region in which the phase separation takes place.

When the heat treatment has been properly carried out, the glass will be essentially separated into two distinct, but continuous glassy phases. (Ordinarily there will be no crystalline phases present.) Because of this phase separation, the glass will be opalescent in appearance. One of these glassy phases is observed to be rich in alumina, alkaline earth oxides, soda and boron oxides. This glassy phase is relatively stable and is quite resistant to acids and alkalis. The other glassy phase is rich in silica and is also very stable. It is observed that the phases are formed in proportion to the ratio of their respective constituents in the original glass.

As described above, the higher temperatures require shorter time periods to effect the desired phase separation, but the glass is also more likely to deform or devitrify at the higher temperatures. Generally speaking, however, glasses with the aforesaid composition range are quite resistant to devitrification during the required heat treatment.

The following examples are included by way of illustration and should not be interpreted as a limitation on the invention. The optical properties present in the examples are reported in terms of the equipment utilized in obtaining the data.

The difficulties associated with measuring and comparing optical data for materials that have a tendency to scatter the incident light beam (e.g. opal and opalescent glasses) are well known. The basic problem is due to the fact that a portion of the radiant energy entering the test sample is scattered within the sample and therefore is not detected as reflected, absorbed or transmitted radiation by ordinary spectrophotometers. The test procedure utilized in the examples attempts to compensate for this scattering effect.

Example 1

The batch materials

| | Grams |
|---|---|
| Sand | 3618.53 |
| Raw dolomite lime | 1414.88 |
| Miss. high calcite lime | 72.48 |
| Alumina | 323.83 |
| Borax | 175.63 |
| Soda ash | 146.43 |
| Potassium carbonate | 85.18 | were melted in a platinum crucible at glass temperatures of 2900° F. in an electric furnace with mechanical stirring. The melting time was about 24 hours to assure homogeneity.

Several glass tumblers were formed from the molten glass by conventional blowing techniques. The finished tumblers were transparent and had the appearance of ordinary soda-lime glass tumblers, and had the following composition and properties:

| Component: | Percent by weight |
|---|---|
| $SiO_2$ | 71.5 |
| $Al_2O_3$ | 6.5 |
| CaO | 9.6 |
| MgO | 6.2 |
| $Na_2O$ | 2.8 |
| $K_2O$ | 1.2 |
| $B_2O_3$ | 2.4 |
| $Fe_2O_3$ (impurity) | 0.1 |

| | |
|---|---|
| Log 3 viscosiy, ° F. | 2465 |
| Log 7 viscosity, ° F. | 1698 |
| Liquidus, ° F. | 2240 |
| Log viscosity at liquidus | 3.7 |
| Coefficient of thermal expansion/° C.×10⁷ (0–300° C.) | 57 |

The tumblers were then maintained at 800° C. for 24 hours in an electric furnace. At the end of the period the tumblers were uniformly opaque-opal in appearance. The other properties of the glass (i.e. density, chemical durability, coefficient of expansion) were not materially altered by the above-described heat treatment.

Example 2

Batch materials were melted according to the method of Example 1 to form a homogeneous molten glass having the composition and properties:

| Component: | Percent by weight |
|---|---|
| $SiO_2$ | 70.6 |
| $Al_2O_3$ | 6.8 |
| CaO | 9.4 |
| MgO | 6.1 |
| $Na_2O$ | 3.3 |
| $K_2O$ | 1.4 |
| $B_2O_3$ | 2.2 |
| $Fe_2O_3$ (impurity) | 0.06 |

| | |
|---|---|
| Liquidus, ° F. | 2265 |
| Coefficient of thermal expansion/° C.×10⁷ (0–300° C.) | 56 |

The molten glass was cast into several small rectangular plates about 25 x 19 x 3 mm. in size. The plates were clear and transparent in appearance after casting.

Three of the sample plates were selected, and each plate was subjected to a specialized heat treatment in an electric laboratory furnace. One plate was not subjected to any heat treatment and is presented as a control sample.

Sample Plate 1

Heat treatment—none
Appearance—clear and transparent with no visible scattering of light Sample Plate 2

Heat treatment—2 hours at 800° C.
Appearance—very slight blue against a black background; faint turbidity Sample Plate 3

Heat treatment—2 hours at 830° C.
Appearance—definite blue against a black background; definite turbidity Sample Plate 4

Heat treatment—2 hours at 900° C.
Appearance—completely opaque-opal

To further characterize the optical properties of Sample Plate 4, the reflectance and transmission of radiant energy was determined by spectrophotomeric techniques after the samples had been ground and polished to remove surface imperfections. The spectral transmission data was determined using a Beckman Model DK–2A spectrophotometer equipped with an integrating sphere to more efficiently collect the scattered radiation. This transmission measurement was obtained by focusing a colimated monochromatic beam of light through the sample upon a detector. The amount of energy (detected over the wavelength range of interest) was then recorded as a percentage of the amount of energy incident upon the sample. The integrating sphere mentioned above more efficiently collects the transmitted radiation that is diffracted or scattered so as not to be emergent parallel to the incident radiation. By this method nearly all of the energy incident on the sample is accounted for.

The reflectance and transmission curves for Plate 4 as a function of wavelength are shown in FIG. 1. These curves are characteristic of desirable highly opaque-opal glasses.

Example 3

To further demonstrate the properties of the opal glasses of the present invention, several samples were prepared from the glass composition of Example 2 for density determination. The density of the clear, transparent glass as formed was measured by standard techniques and observed to be 2.4691 gm./cc. A similar sample of the same glass composition was heat treated at 930° C. for 21 hours. At the end of this period the sample was uniformly opal in appearance. The density was observed to be 2.5591 gm./cc. which corresponds to an increase of about 3.6%.

Example 4

Batch materials were melted by the methods of Example 1 to form a homogeneous molten glass of the composition:

| Component: | Percent by weight |
|---|---|
| $SiO_2$ | 62.0 |
| $Al_2O_3$ | 6.0 |
| CaO | 10.6 |
| MgO | 7.5 |
| $Na_2O$ | 5.0 |
| $Be_2O_3$ | 9.0 |

Cane samples were drawn from the molten glass and allowed to cool rapidly in the ambient air. The cane was cut into sample rods which were clear and transparent in appearance.

Several of the sample rods were heat treated at 800° C. for 64 hours. The resulting glass was uniformly opal in appearance. The X-ray diffraction pattern of this opal glass indicated that significant amounts of the crystalline species diopside ($CaO.MgO.2SiO_2$) was present on the surface. This indicates that even if the glasses of the invention are heat treated for prolonged periods, they will divitrify (this is true of most glasses) but that the presence of this crystalline species is not detrimental to the opal appearance.

Example 5

Batch materials were melted according to the method of Example 1 to produce a glass having the following composition and properties:

| Component: | Percent by weight |
|---|---|
| $SiO_2$ | 68.8 |
| $Al_2O_3$ | 6.4 |
| CaO | 11.3 |
| MgO | 7.3 |
| $Na_2O$ | 4.0 |
| $K_2O$ | --- |
| $B_2O_3$ | 2.4 |
| Log 3 viscosity | 2360 |
| Log 7 viscosity | 1611 |
| Liquidus | 2260 |
| Log viscosity at liquidus | 3.3 |

The batch size was about 10 pounds in total weight and the melting was carried out in a refractory container at 2900° F. in a gas fired furnace over the period of 24 hours with mechanical stirring. Sample rods were drawn from the melt. The rods were clear and transparent in appearance. In order to determine the effect of opalization of the glass on the glass stability, durability tests were performed on the clear glass as formed and on the opalized glass after heat treatment. The standard United States Pharmacopoeia XVII test procedure was used. This test method is designated:

United States Pharmacopoeia XVII
containers—glass
chemical resistance—water attack
powdered glass test This test procedure is also designated C–225–59T by ASTM (Method P.W. Resistance of Powdered Sample to Attack by Distilled Water).

Generally speaking, the test consists of extracting a powder sample of the glass with a given volume of water at an elevated temperature for a definite time period. At the end of this time period, the water is titrated to neutrality using $N/50$ $H_2SO_4$ to neutralize the extract from the powdered glass. The test results are reported in terms of the milliliters $N/50$ $H_2SO_4$ required. The lower the number of ml. of $N/50$ $H_2SO_4$, the better is the chemical durability.

TEST RESULTS

| Sample: | Ml. $N/50$ $H_2SO_4$ to neutralize water extract |
|---|---|
| Sample rods as formed (clear and transparent in appearance) | 1.8 |
| Sample rods after heat treatment at 800° C. for 10 hours (opaque-opal in appearance) | 2.5 |

The above data indicates that the chemical durability to water attack is not materially reduced by the opalization heat treatment.

Example 6

Compositions 6A, 6B, and 6C as set forth below, were melted by the method of Example 1 from appropriate batch materials and drawn into clear, transparent rods. Tests were performed to determine the minimum time-temperature relationship that causes opalization. The times and temperatures reported below are the minimum temperatures at the given times to cause the glass composition to become faintly turbid or "milky" in appearance.

| | Percent by weight of— | | |
|---|---|---|---|
| | 6A | 6B | 6C |
| Component: | | | |
| $SiO_2$ | 69.7 | 69.8 | 64.8 |
| $Al_2O_3$ | 6.3 | 6.2 | 6.7 |
| CaO | 10.6 | 10.6 | 11.2 |
| MgO | 7.3 | 7.4 | 7.8 |
| $Na_2O$ | 3.0 | 5.0 | 3.7 |
| $K_2O$ | | | |
| $B_2O_3$ | 2.9 | 1.0 | 5.8 |
| Log 3 viscosity | 2,445 | 2,405 | 2,284 |
| Log 7 viscosity | 1,611 | | |
| Liquidus | 2,427 | 2,277 | 2,217 |
| Log viscosity at liquidus | 3.0 | 3.4 | 3.2 |
| | Heat treatment temperature, ° C. | | |
| Time, hours: | | | |
| 1 | 800 | (¹) | 710 |
| 64 | 725 | 720 | 675 |

¹ Did not opalize.

Example 7

The following data is presented to further demonstrate the relationship of heat treatment to composition in glasses of the present invention.

Glasses of the following compositions were melted from appropriate batch materials according to the method of Example 1 and drawn into 5 inch rods about ¼ inch diameter. The visual appearance of the rods, as drawn, was observed.

The rods were then heat treated to determine the four following temperatures:

(1) The lowest temperature that would produce slight visible opalescene (faint turbidity or milkiness) after 1 hour of heat treatment.

(2) The lowest temperature that would produce a dense white opal glass after 1 hour of heat treatment.

(3) The lowest temperature that would produce slight visible opalescence after 64 hours of heat treatment.

(4) The lowest temperature that would produce a dense white opal glass after 64 hours of heat treatment.

These temperatures were determined by placing the rods in a gradient furnace, having a stabilized temperature profile, for the specified time period. Since the gradient furnace had a known uniform temperature gradient of about 350° C. over the length of the rod, the exact temperature for each point along the rod was known. This data is set forth in Table I.

TABLE I

| Ex. | Glass composition in, weight percent | | | | | | Appearance of rods as drawn | Lowest temperature for development of visible opalescence, (° C.) | | Lowest temperature for development of dense opal appearance, (° C.) | |
|---|---|---|---|---|---|---|---|---|---|---|---|
| | Al₂O₃ | Na₂O | SiO₂ | CaO | MgO | B₂O₃ | | After 1 hr. | After 64 hrs. | After 1 hr. | After 64 hrs. |
| 7-1 | 2 | 3 | 73.0 | 12.9 | 9.1 | 0 | Opal | (¹) | (¹) | (¹) | (¹) |
| 7-2 | 2 | 5 | 73.0 | 11.7 | 8.3 | 0 | Clear | 810 | 725 | (²) | (²) |
| 7-3 | 2 | 5 | 73.0 | 10.6 | 7.4 | 2 | ...do | 760 | 675 | (²) | (²) |
| 7-4 | 2 | 5 | 73.0 | 9.4 | 6.6 | 4 | Opalescent | (¹) | (¹) | (²) | (²) |
| 7-5 | 2 | 5 | 69.0 | 10.6 | 7.4 | 6 | ...do | (¹) | (¹) | 825 | 750 |
| 7-6 | 2 | 5 | 65.0 | 11.7 | 8.3 | 8 | ...do | (¹) | (¹) | 800 | 730 |
| 7-7 | 2 | 5 | 69.0 | 8.2 | 5.8 | 10 | ...do | (¹) | (¹) | 780 | 740 |
| 7-8 | 2 | 7 | 73.0 | 9.4 | 6.6 | 2 | Clear | (²) | (²) | (²) | (²) |
| 7-9 | 2 | 7 | 73.0 | 7.0 | 5.0 | 6 | ...do | (²) | 690 | (²) | (²) |
| 7-10 | 2 | 7 | 69.0 | 7.0 | 5.0 | 10 | ...do | 750 | 675 | (²) | (²) |
| 7-11 | 4 | 1 | 69.0 | 15.3 | 10.7 | 0 | Opal | (¹) | (¹) | (¹) | (¹) |
| 7-12 | 4 | 3 | 69.0 | 14.1 | 9.9 | 0 | Clear | 720 | 690 | (²) | 780 |
| 7-13 | 4 | 3 | 69.0 | 12.9 | 9.1 | 2 | Opalescent | (¹) | (¹) | (¹) | 775 |
| 7-14 | 4 | 3 | 69.0 | 11.7 | 8.3 | 4 | ...do | (¹) | (¹) | (¹) | (¹) |
| 7-15 | 4 | 3 | 61.0 | 15.3 | 10.7 | 6 | Clear | (²) | 715 | (²) | (²) |
| 7-16 | 4 | 5 | 73.0 | 10.6 | 7.4 | 0 | ...do | (²) | 720 | (²) | 800 |
| 7-17 | 4 | 5 | 69.0 | 10.6 | 7.4 | 4 | ...do | 780 | 710 | (²) | 760 |
| 7-18 | 4 | 5 | 62.0 | 12.9 | 9.1 | 7 | ...do | 750 | 700 | 810 | 750 |
| 7-19 | 4 | 5 | 65.0 | 8.2 | 5.8 | 12 | Opalescent | (¹) | (¹) | 740 | 725 |
| 7-20 | 4 | 7 | 70.0 | 5.3 | 3.7 | 10 | Clear | (²) | 680 | (²) | 730 |
| 7-21 | 4 | 7 | 65.0 | 5.9 | 4.1 | 14 | ...do | 725-775 | 670 | (²) | 690 |
| 7-22 | 6 | 0 | 75.5 | 10.6 | 7.4 | 0.5 | Opal | (¹) | (¹) | (¹) | (¹) |
| 7-23 | 6 | 1.5 | 74.0 | 10.6 | 7.4 | 0.5 | Opalescent | (¹) | (¹) | (¹) | (¹) |
| 7-24 | 6 | 1.5 | 67.0 | 14.1 | 9.9 | 1.5 | ...do | (¹) | (¹) | 900 | 810 |
| 7-25 | 6 | 1.5 | 70.0 | 10.6 | 7.4 | 4.5 | Opal | (¹) | (¹) | (¹) | (¹) |
| 7-26 | 6 | 1.5 | 67.0 | 10.6 | 7.4 | 7.5 | ...do | (¹) | (¹) | (¹) | (¹) |
| 7-26a | 6 | 3 | 72.5 | 10.6 | 7.4 | 0.5 | Clear | 820 | 730 | 925 | 800 |
| 7-27 | 6 | 3 | 71.5 | 10.6 | 7.4 | 1.5 | ...do | 840 | 700 | (²) | 775 |
| 7-28 | 6 | 3 | 70.0 | 10.6 | 7.4 | 3 | ...do | 825 | 680 | 910 | 760 |
| 7-29 | 6 | 3 | 68.5 | 10.6 | 7.4 | 4.5 | Opalescent | (¹) | (¹) | 805 | (¹) |
| 7-30 | 6 | 3 | 67.0 | 10.6 | 7.4 | 6 | ...do | (¹) | (¹) | 800 | (¹) |
| 7-31 | 6 | 3 | 66.5 | 10.6 | 7.4 | 7.5 | Opal | (¹) | (¹) | (¹) | (¹) |
| 7-32 | 6 | 3 | 64.0 | 10.6 | 7.4 | 9 | ...do | (¹) | (¹) | (¹) | (¹) |
| 7-33 | 6 | 3 | 58.0 | 15.8 | 11.2 | 6 | Clear | 775 | 710 | 880 | 760 |
| 7-34 | 6 | 3 | 55.0 | 14.1 | 9.9 | 12 | Opal | (¹) | (¹) | (¹) | (¹) |
| 7-35 | 6 | 5 | 71.0 | 10.6 | 7.4 | 0 | Clear | (¹) | 720 | (²) | (²) |
| 7-36 | 6 | 5 | 69.5 | 10.6 | 7.4 | 1.5 | ...do | (²) | 720 | (²) | 775 |
| 7-37 | 6 | 5 | 68.0 | 10.6 | 7.4 | 3 | ...do | 800 | 700 | (²) | 750 |
| 7-38 | 6 | 5 | 66.5 | 10.6 | 7.4 | 4.5 | ...do | 760 | 680 | (²) | 740 |
| 7-39 | 6 | 5 | 65.0 | 10.6 | 7.4 | 6 | ...do | 750 | 670 | 825 | 720 |
| 7-40 | 6 | 5 | 63.5 | 10.6 | 7.4 | 7.5 | ...do | 740 | 600 | 800 | 710 |
| 7-41 | 6 | 5 | 62.0 | 10.6 | 7.4 | 9 | ...do | 760 | 655 | 810 | 700 |
| 7-42 | 6 | 5 | 60.5 | 10.6 | 7.4 | 10.5 | ...do | 740 | 640 | 800 | 690 |
| 7-43 | 6 | 5 | 66.0 | 10.6 | 7.4 | 5 | ...do | 760 | 700 | (²) | 740 |
| 7-44 | 6 | 5 | 59.0 | 10.6 | 7.4 | 12 | Opalescent | (¹) | (¹) | 790 | 670 |
| 7-45 | 6 | 5 | 71.0 | 7.0 | 5.0 | 6 | Clear | 750 | 680 | 825 | 740 |
| 7-46 | 6 | 5 | 69.0 | 5.9 | 4.1 | 10 | ...do | 750 | 670 | (²) | 725 |
| 7-47 | 6 | 7 | 73.0 | 4.7 | 3.3 | 6 | ...do | (²) | 670 | (²) | 700 |
| 7-48 | 6 | 7 | 65.0 | 8.2 | 5.8 | 8 | ...do | (²) | 675 | (²) | (²) |
| 7-49 | 6 | 7 | 61.0 | 7.0 | 5.0 | 14 | ...do | 710 | 670 | 700 | (²) |
| 7-50 | 6 | 9 | 65.0 | 9.4 | 6.6 | 4 | ...do | (²) | 660 | (²) | 700 |
| 7-51 | 6 | 9 | 65.0 | 8.2 | 5.8 | 6 | ...do | (²) | 680 | (²) | 725 |
| 7-52 | 8 | 3 | 71.0 | 9.4 | 6.6 | 2 | ...do | 850 | 740 | (²) | 800 |
| 7-53 | 8 | 3 | 65.0 | 10.6 | 7.4 | 6 | ...do | 800 | 725 | 875 | 740 |
| 7-54 | 8 | 3 | 71.0 | 4.7 | 3.3 | 10 | ...do | 785 | 790 | (²) | (²) |
| 7-55 | 8 | 3 | 67.0 | 4.7 | 3.3 | 14 | ...do | 775 | 775 | (²) | (²) |
| 7-56 | 10 | 3 | 67.0 | 8.2 | 5.8 | 6 | ...do | 830 | 690 | (¹) | 775 |
| 7-57 | 10 | 3 | 67.0 | 5.9 | 4.1 | 10 | ...do | (²) | 750 | (²) | (²) |
| 7-58 | 10 | 3 | 55.0 | 10.6 | 7.4 | 14 | ...do | 760 | 710 | 790 | 730 |
| 7-59 | 10 | 5 | 63.0 | 9.4 | 6.6 | 6 | ...do | (²) | 730 | (²) | 770 |
| 7-60 | 10 | 5 | 55.0 | 9.4 | 6.6 | 14 | ...do | 740 | 699 | 785 | 720 |

¹ Signifies that the particular test condition was not evaluated.
² Signifies that opalization did not occur at the test conditions indicated.

As previously set forth, the preferred opalizable glass compositions are those having the following general and preferred ranges:

| | Percent by weight | |
|---|---|---|
| | General | Preferred |
| Component: | | |
| Al₂O₃ | 1.5-12 | 2-8 |
| SiO₂ | ¹ Balance | ² Balance |
| B₂O₃ | 0.15 | 0.13 |
| CaO | 5.20 | 6.8 |
| MgO | 0.15 | 0.4 |
| Na₂O | 1-11 | 1.5-7 |
| K₂O | 0-5 | 0-2 |
| Li₂O | <2 | <2 |
| wherein | | |
| CaO+MgO | 10-30 | 10-12 |
| Na₂O+K₂O | <11 | <9 |
| Weight percent B₂O₃/weight percent Na₂O | 0-15 | 0-7 |
| (SiO₂+Al₂O₃+B₂O₃+CaO+MgO+Na₂O) | >95 | >98 |

¹ Generally 55-76.
² Preferably 60-70.

As a general range for the thermally opalizable alkaline earth aluminosilicate glass compositions that prefer- ably form opal glasses by subsequent heat treatments after the forming operation, the following compositions may be used.

| | Approximate percent by weight | |
|---|---|---|
| | General | Preferred |
| Component: | | |
| SiO₂ | 55-76 | 60-70 |
| Al₂O₃ | 1.5-12 | 4-8 |
| B₂O₃ | 0-13 | 1-9 |
| CaO | 5-20 | 6-16 |
| MgO | 0-15 | 4-12 |
| Na₂O | 1-11 | 3-7 |
| K₂O | 0-5 | |
| Li₂O | <2 | |
| wherein | | |
| (CaO+MgO) | 10-30 | 14-21 |
| (Na₂O+K₂O) | <11 | <8 |
| Weight percent B₂O₃/weight percent Na₂O | 0-5 | 0.2-3 |
| (SiO₂+Al₂O₃+B₂O₃+CaO+MgO+Na₂O) | >95 | >98 |

A highly preferred range, especially for those glasses that opalize during forming, is the following approximate formulation:

| Component: | Percent by weight |
|---|---|
| $SiO_2$ | 70–72 |
| $Al_2O_3$ | 3–5 |
| $MgO+CaO$ | 10–12 |
| $B_2O_3$ | 11–13 |
| $Na_2O$ | 2–4 |

A highly preferred composition that will opalize during forming and particularly one that will strike in the mold is one as follows:

| Component: | Approximate percent by weight |
|---|---|
| $SiO_2$ | 71 |
| $Al_2O_3$ | 4 |
| $MgO+CaO$ | 10 |
| $B_2O_3$ | 12 |
| $Na_2O$ | 3 |

Another composition that will opalize while the glass article is being formed in the mold is one having the following approximate composition:

| Component: | Percent by weight |
|---|---|
| $SiO_2$ | 70.5 |
| $Al_2O_3$ | 3 |
| $CaO$ | 6.4 |
| $MgO$ | 4.6 |
| $B_2O_3$ | 13 |
| $Na_2O$ | 2.6 | the glass having a rate of opalization sufficient that it opalizes during forming, its coefficient of thermal expansion (0–300° C.) is not substantially greater than about $45 \times 10^{-7}/°$ C. and the log of its viscosity at its liquidus temperature is at least about 4.

The above-described glass compositions that opalize during forming or by subsequent heat treatment are all compositions that can be handled in practical commercial operations. As noted in the examples, particularly Examples 7–22, such glass composition opalized but the glass was quite stiff and is not feasible for commercial melting and forming operations. The viscosity and the liquidus temperature are too high and the weight percent ratio of $B_2O_3:Na_2O$ is too great for it to be a useful commercial composition.

In general, the amount of RO ($CaO+MgO$) is preferably about 10–12 weight percent. Based on this amount of RO and using about the minimum of $Na_2O$, namely about 1 to 1.5 weight percent, the amount of $B_2O_3$ that one should use in order to obtain a glass suitable for large scale production is about 14–15 weight percent $B_2O_3$. This amount of $B_2O_3$ will be enough to provide a viscosity for the glass at the melting temperature that can be handled in production, the viscosity at 3100° F. being not greater than about $10^{2.5}$ poises for particular compositions. When the amount of $Na_2O$ is increased to about 7 (and is even as high as 9), it is difficult to opalize all the glasses even after a 64 hour heat treatment. When the amount of $Na_2O$ is about 3, the amount of $B_2O_3$ generally used is about 11–12 weight percent in order to attain a log viscosity of 2.5 (or a viscosity of $10^{2.5}$ poises) at 3100° F. Hence, the preferred ratio of weight percent $B_2O_3$ to weight percent $Na_2O$ is no more than about 8:1 or 7:1 and it is even more highly preferred that the $B_2O_3:Na_2O$ ratio be no more than about 5:1 as previously indicated.

From the foregoing description, it is apparent that a novel system of thermally opalizable glass compositions has been discovered and developed. It is also apparent that modifications may be resorted to within the spirit and scope of the present invention as defined by the following claims.

What is claimed is:

1. An alkaline earth aluminosilicate glass composition thermally opalizable at a temperature of about 650° to 850° C., the composition consisting essentially of the following oxide components in approximate percents by weight:

| Component: | Percent by weight |
|---|---|
| $SiO_2$ | 60–70 |
| $Al_2O_3$ | 4–8 |
| $B_2O_3$ | 1–9 |
| $CaO$ | 6–16 |
| $MgO$ | 4–12 |
| $Na_2O$ | 3–7 | wherein

| | |
|---|---|
| $(CaO+MgO)$ | 14–21 |
| $(Na_2O+K_2O)$ | <8 |
| Weight percent $B_2O_3$/weight percent $Na_2O$ | 0.2–3 |
| $(SiO_2+Al_2O_3+B_2O_3+CaO+MgO+Na_2O)$ | >98 |

2. An alkaline earth aluminosilicate glass composition thermally opalizable at a temperature of about 650° to 850° C. consisting essentially of 4% by weight of $Al_2O_3$, 7% by weight of $Na_2O$, 65% by weight of $SiO_2$, 5.9% by weight of $CaO$, 4.1% by weight of $MgO$ and 14% by weight of $B_2O_3$.

3. An alkaline earth aluminosilicate glass composition thermally opalizable at a temperature of about 650° to 850° C. consisting essentially of 6% by weight of $Al_2O_3$, 3% by weight of $Na_2O$, 55% by weight of $SiO_2$, 14.1% by weight of $CaO$, 9.9% by weight of $MgO$ and 12% by weight of $B_2O_3$.

4. An alkaline earth aluminosilicate glass composition thermally opalizable at a temperature of about 650° to 850° C. consisting essentially of 6% by weight of $Al_2O_3$, 5% by weight of $Na_2O$, 59% by weight of $SiO_2$, 10.6% by weight of $CaO$, 7.4% by weight of $MgO$ and 12% by weight of $B_2O_3$.

5. An alkaline earth aluminosilicate glass composition thermally opalizable at a temperature of about 650° to 850° C. consisting essentially of 6% by weight of $Al_2O_3$, 5% by weight of $Na_2O$, 69% by weight of $SiO_2$, 5.9% by weight of $CaO$, 4.1% by weight of $MgO$ and 10% by weight of $B_2O_3$.

6. An alkaline earth aluminosilicate glass composition thermally opalizable at a temperature of about 650° to 850° C. consisting essentially of 10% by weight of $Al_2O_3$, 3% by weight of $Na_2O$, 55% by weight of $SiO_2$, 10.6% by weight of $CaO$, 7.4% by weight of $MgO$ and 14% by weight of $B_2O_3$.

References Cited

UNITED STATES PATENTS

| 3,054,686 | 9/1962 | Hagedorn | 106—54 |
| 3,121,628 | 2/1964 | Loerhrke | 65—18 |
| 3,275,492 | 9/1966 | Herbert | 106—52 X |
| 3,420,684 | 1/1969 | Hagedorn | 106—54 |
| 3,413,133 | 11/1968 | Stalego | 106—54 X |

OTHER REFERENCES

Levin et al.: Structural Interpretation of Immiscibility in Oxide Systems, in Journ. Amer. Cer. Soc., 42, 1958, pp. 49–54.

JAMES E. POER, Primary Examiner

W. R. SATTERFIELD, Assistant Examiner

U.S. Cl. X.R.

106—52.